Dec. 21, 1926. 1,611,738
W. C. J. GUILFORD
APPARATUS FOR REPAIRING FENDERS
Original Filed June 23, 1921 2 Sheets-Sheet 1
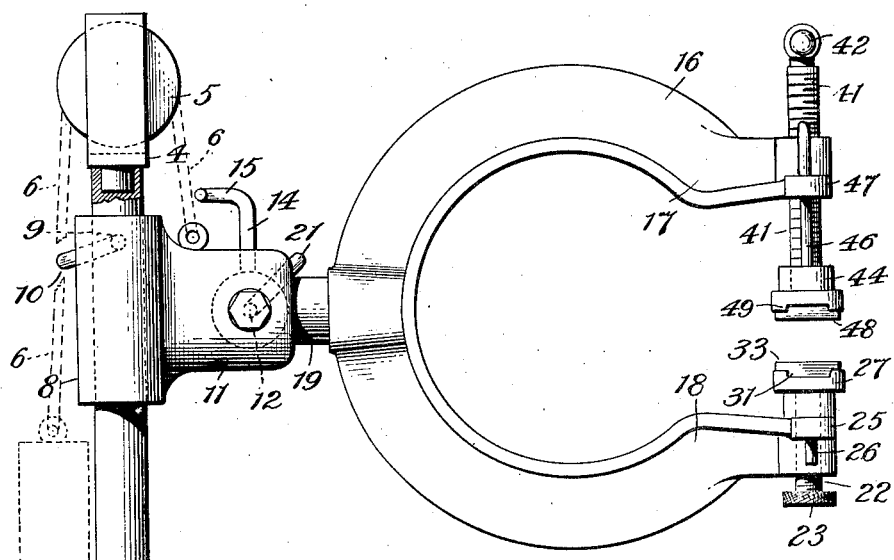
Fig. 2.
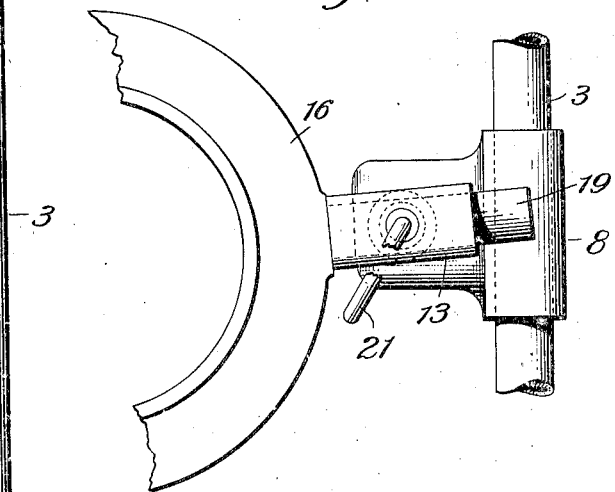
Fig. 1.
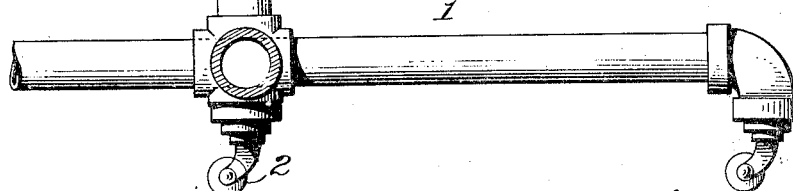
Witness:
James S. Hutchinson
Inventor:
William C. J. Guilford
By Milans & Milans
Attorneys

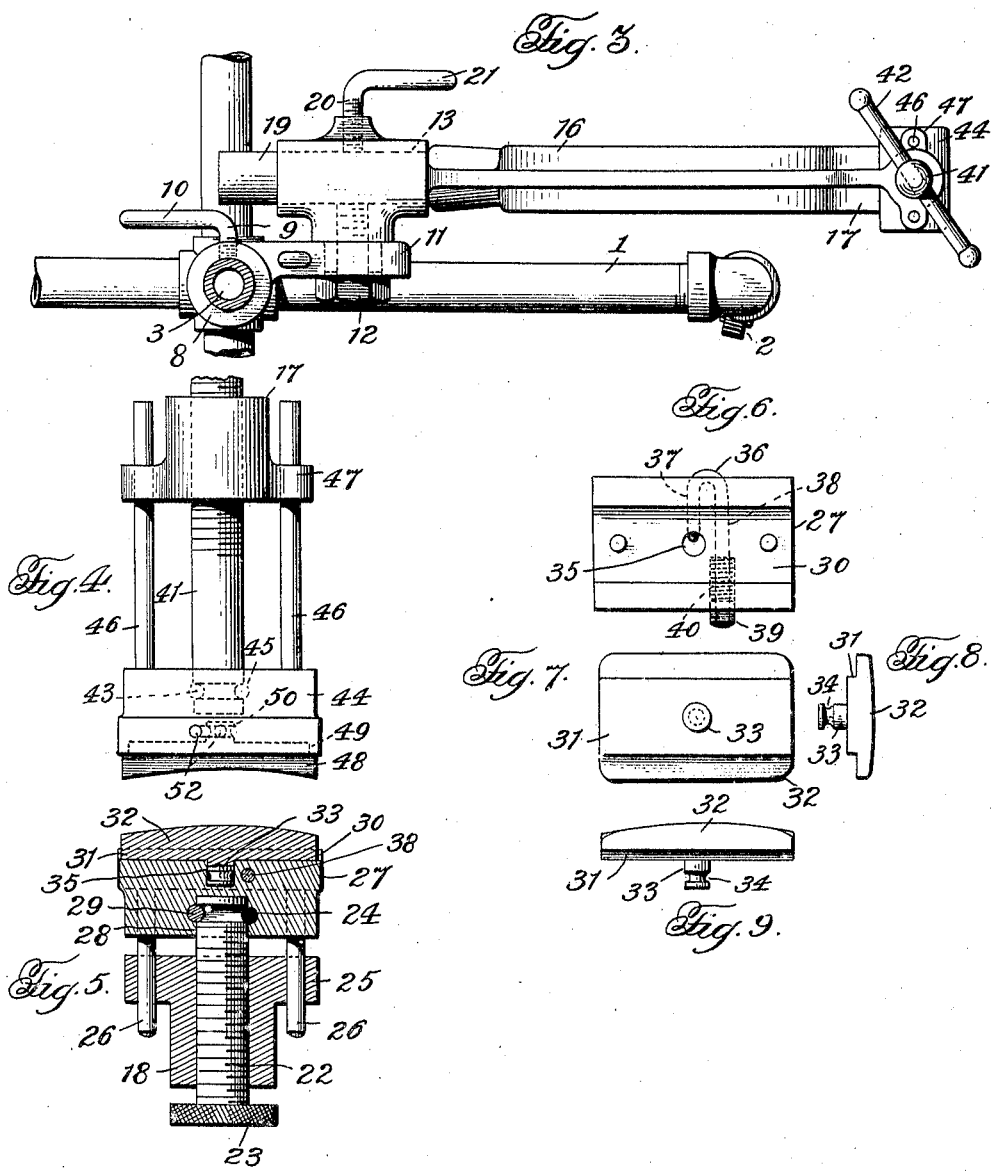

Patented Dec. 21, 1926.

1,611,738

UNITED STATES PATENT OFFICE.

WILLIAM C. J. GUILFORD, OF HARRISON, MAINE.

APPARATUS FOR REPAIRING FENDERS.

Application filed June 23, 1921, Serial No. 479,759. Renewed May 15, 1926.

My invention relates to new and useful improvements in an apparatus for repairing automobile fenders or mud guards, and has for its principal object the provision of such an apparatus which is easily portable from place to place and which may be adjusted to various vertical or angular positions to adapt itself to various work.

Another object resides in the provision of novel means for detachably connecting the dies to the die-carrying blocks as well as means for adjusting the dies with respect to one another.

A further object consists in the provision of means for detachably connecting the die-carrying blocks to the block adjusting means whereby different types of die-carrying blocks may be used.

With the above and other objects in view which will appear as the description proceeds, my invention consists of the novel details of construction and arrangement of parts described and illustrated in the following specification and drawings, and while I have illustrated and described the preferred embodiment of the invention, it will be understood that such changes may be made as will fall within the scope of the appended claims.

Figure 1 is a side elevation with parts shown in section.

Fig. 2 is a fragmental side elevation of the frame supporting means with relation to the supporting standard.

Fig. 3 is a top plan with the supporting standard shown in horizontal section.

Fig. 4 is a front elevation of the upper die and its carrying and adjusting mechanism.

Fig. 5 is a transverse vertical section through the lower frame arm, die carrying block, and die, with the adjusting means shown in elevation.

Fig. 6 is a top plan of the lower die-carrying block.

Fig. 7 is a bottom plan of the lower die.

Fig. 8 is an end view of the lower die.

Fig. 9 is a side view of the lower die.

As is well known the fenders or mud guards of automobiles are often bent out of shape due to collision or other accidents and in the past considerable difficulty has been experienced in repairing the fenders or mud guards to restore them to their original shape. It is the object of my invention to provide a device of simple construction which may be moved from place to place to the point where the automobile may be located, and which may be so adjusted as to adapt itself to fenders or mud guards at different distances above the ground and which may be angularly adjusted to adapt itself to the different curvatures of the fender or guard or to reach such points as have been bent or otherwise damaged.

In the drawings, the numeral 1 indicates a base in the form of a plurality of arms carried upon suitable casters indicated at 2. A standard 3 is carried by the base and is preferably tubular in form for a purpose which will later appear. A casting 4 is rotatably supported on the top of the standard 3 and carries a pulley 5 over which a cable 6 or other suitable flexible strip is adapted to operate. A weight 7 is secured to one end of the cable 6 and a sleeve 8 is connected to the opposite end of the cable. As shown, the sleeve is carried by the standard 3 and is vertically adjustable thereon, said sleeve being held in its various vertically adjusted positions by means of the counterbalanced weight 7. A screw 9 extends through the sleeve 8 and is adapted to engage the standard 3 to secure the sleeve in adjusted position. It will be understood that this screw is not necessary at all times as the counterbalancing weight 7 will normally properly hold the sleeve in position. However, at times it is desired to lock the sleeve upon the standard so that the weight cannot be overcome should pressure be placed upon the sleeve or its associated parts to be later described. The screw 9 has a right-angled extension 10 forming a handle by means of which the said screw may be easily operated.

The arm 11 is formed on the sleeve 8 and has a transversely extending opening therethrough adapted to receive a bolt 12 which is secured to a normally horizontally extending sleeve 13. The bolt 12 is of such a diameter as to be rotatable in the opening in the arm 11 and is held against rotation by the screw 14 which passes through a vertically extending screw threaded opening in the arm 11. This screw is provided with a right-angled extension 15 forming a handle by means of which the screw may be operated.

A substantially C-shaped frame 16, having the upper arm 17 and the lower arm 18, is carried by the sleeve 13, said frame being formed, on its rear edge, with a shank or shaft 19 which extends through the said sleeve 13. This shaft 19 will be of such a diameter as to be freely rotatable within the sleeve and is adapted to be held against rotation by the screw 20 which passes through a screw-threaded opening in the sleeve and engages the outer surface of the shaft. This screw is provided with a right-angled extension 21 forming a handle through means of which the screw may be rotated. It will thus be seen that the C-shaped frame 16 may be adjusted to various angular positions by merely releasing the screw 20 and rotating the shaft 19 with respect to the sleeve 13, or by releasing the screw 14 and rotating the bolt 12 with respect to the arm 11. The casting may be also vertically adjusted by sliding the sleeve 8 upon the standard 3. The rear end of the upper arm 17 of the frame 16 will preferably be inclined upwardly and the rear end of the lower arm 18 will preferably be inclined downwardly so as to provide a greater width between the arms at the rear ends than at the forward ends so that when a fender or mud guard is in position between the said arms the frame may be swung to various angular positions without having its movement limited by contact with the fender. The lower arm 18 of the C-shaped frame is provided, adjacent its forward end, with a vertically extending screw-threaded opening in which a screw 22 operates, said screw being provided on its lower end with a knob 23 and formed adjacent its upper end with a circumferentially extending groove 24 for a purpose to be later described. An ear 25 is formed on each side of the arm 18, adjacent the forward end thereof, and each of these ears is provided with a vertically extending opening to receive the rods 26 formed on the lower surface of a die-carrying block 27. This block 27 is provided in its under surface with an opening 28 adapted to receive the upper end of the screw 22 which operates in the opening in the arm 18. A transversely extending opening is formed in the die block, to intersect the opening 28, and a pin 29 is adapted to be received in said transversely extending opening and also in the circumferentially extending groove 24 formed adjacent the upper end of the screw 22. By means of this pin 29 the die-carrying block 27 will be connected to the screw 22 and will be operated thereby. The rods 26, on the block 27, extending through the openings in the ears 25, will prevent the block from rotating, during the rotation of the screw 22, and will therefore be moved vertically when the screw is operated. The die-block 27 is provided in its upper face with a longitudinally extending recess 30 to receive the reduced extension 31 on the lower surface of the die 32. The upper surface of the die 32 is slightly convexed, as shown, for a purpose which will be later described. A projection 33 is formed on the under side of the die 32 and is provided with a circumferentially extending groove 34. This projection 33 is adapted to be received in an opening 35 in the die-carrying block and is held therein by means of a spring catch 36, one end of said spring catch being received in the circumferentially extending groove 34. As shown in the drawings, this spring catch is of substantially U-shape having a short arm 37 and a long arm 38. Each arm of the catch operates in an opening formed transversely of the die-carrying block 27, the short arm 37 being of sufficient length to extend slightly within the opening 35 in the die block and the long arm 38 being of sufficient length to extend entirely through the said die block and receive a ring or sleeve 39 which forms an abutment for the spring 40 which surrounds the long arm 38 of the catch and thereby normally holds the end of the short arm 37 in the opening 35 to engage in the groove 34 in the projection 33 on the die. By the construction shown and described, it will be seen that the die block 27 may be detached from the screw 22 and the die 32 may be easily detached from the die-carrying block. By this construction various shaped dies may be connected to the die-carrying block or differently shaped or sized die-carrying blocks may be connected to the screw.

The upper arm 17 of the frame 16 is provided adjacent the forward end with a vertically extending screw threaded opening adapted to receive the screw threaded rod 41 which has a horizontally extending opening formed adjacent the upper end to receive a sliding rod 42 which is used as a handle for rotating the said threaded rod 41. The rod 41 is formed adjacent the lower end with a circumferentially extending groove 43. A die-carrying block 44 is adapted to be connected to the lower end of the screw threaded rod 41 by means of a pin 45 which extends through an opening in the block and engages in the groove 43. The die-carrying block is provided in its upper surface with an opening adapted to receive the lower end of the rod 41. The pin 45 passing through the block intersects this opening so as to enter the groove 43 in the screw rod 41 to connect the block to the said rod. Rods 46 are formed on the upper surface of the die-carrying block 44 and are slidable through openings in the ears 47 formed on each side of the upper arms 17 adjacent the forward end thereof. These rods 46 will prevent the die-carrying block from rotating with respect to the threaded rod 41, and when this threaded rod is operated the die-carrying block will be raised and lowered without rotating. A die 48 is carried by the die-carrying block 44, this die being provided on its upper surface with a reduced extension 49 received in a longitudinally extending recess in the lower face of the block. This die has a projection 50 formed on its upper surface and adapted to be received in an opening formed in the die block. The projection has a circumferentially extending groove adapted to be engaged by the short arm of a spring catch 52 of the same construction as the spring catch 36 previously described. The lower face of the die 48 is concaved to cooperate with the convex face of the die 32, the die 32 acting as the male member and the die 48 as the female member.

From the above detailed description of the several parts going forward to make up the completed device, it is thought that the operation and advantages will be clearly understood. As previously stated, the apparatus is primarily intended for straightening fenders or mud guards of automobiles after they have been bent out of shape. The fender or guard will be received between the upper and lower arms of the substantially C-shaped member 16 and a greater space being provided adjacent the rear ends of the arms, the frame or fender may be adjusted without limitation by contact one with the other. The die 32 will engage under the bent portion of the fender and the die 48 will engage over the top portion. Normally the die 32 will remain stationary and the die 48 adjusted through means of the threaded rod 41. As the two dies are brought together, one being convexed and the other concaved, the bent portion of the fender will be straightened and pressed into normal shape. Of course, if desired the die 32 may be adjusted through the means of the screw 22, but it is thought, as above stated, that ordinarily the adjustment of the die 48 will be sufficient. The substantially C-shaped frame 16 may be angularly adjusted to accommodate the dies to the different curvature of the fender and an annular adjustment being obtained by rotating the shaft 19 in the sleeve 13, and a vertical swinging adjustment being obtained by rotating the bolt 12 with respect to the arm 11. At the same time, a further vertical adjustment may be obtained by adjusting the sleeve 8 upon the standard 3, the said sleeve being held in said adjusted position by the counter-balancing weight 7, and if desired, as previously described, by the screw 9 which extends through the sleeve and engages the standard. The sleeve 8 may also be swung upon the standard 3 and when so swung the casting 4 on the upper end of the standard will also swing so as to properly position the cable 6 and weight 7. The base 1 being supported upon the casters 2, the apparatus may be moved from place to place so as to be accessible at the point where the automobile is stored or parked.

Preferably, all the parts of the apparatus, including the dies, will be formed of suitable metal, although at times I find it advisable to form the dies of wood or other suitable material. It will be understood, however, that I do not desire to limit myself to the use of any particular material.

Having fully described my invention, what I claim as new and desire to secure by Letters Patent is:—

1. An apparatus for repairing fenders or the like comprising a support, a sleeve vertically adjustable on the support, a horizontally extending arm formed on the sleeve, a second sleeve pivotally connected to the arm for vertically swinging movement, a frame connected to the second mentioned sleeve for bodily swinging movement of its longitudinal axis, and dies carried by the frame for engaging opposite faces of the fender being repaired.

2. An apparatus for repairing fenders or the like comprising a vertically extending support, a sleeve rotatably mounted and vertically adjustable on the support, a horizontally extending arm formed on the sleeve, a second sleeve pivotally connected to the arm for vertical swinging movement, a frame having a shaft which is rotatably mounted in the second mentioned sleeve, and dies carried by the frame for engaging opposite faces of the fender being repaired.

3. An apparatus for repairing fenders or the like comprising a support, a frame adjustably connected to the support, die blocks carried by the frame and adapted to operate on opposite faces of the fender being repaired, said blocks having grooves formed in their opposed faces, and dies detachably connected to the die blocks, said dies having ribs adapted to be received in the grooves of the die blocks.

4. An apparatus for reshaping deformed mudguards comprising a base support adapted to rest upon the ground, adjacent the wheel of a vehicle, an upright supporting member projecting from the base support, a yoke carried by the upright, arranged to have its open end project inwardly of the plane of the wheel to receive the mudguard while in position on the wheel, said yoke being connected to the upright for vertical swinging movement and for bodily swinging movement of its longitudinal axis, and relatively adjustable dies carried by the arms of the yoke.

5. An apparatus for repairing fenders comprising a support, a frame adjustably connected to the support, die blocks carried by the frame and adapted to operate on opposite faces of the fender being repaired, spring catches carried by the die blocks, and dies detachably connected to the die blocks by means of the spring catches.

6. An apparatus for repairing fenders comprising a support, a frame adjustably connected to the support, die blocks carried by the frame and adapted to operate on opposite faces of the fender being repaired, each of said die blocks having an opening therein, spring catches carried by the die blocks and intersecting the openings therein, and dies detachably connected to the die blocks, each of said dies having a projection adapted to be received in the opening in the die block and provided with a recess to receive the spring catch.

7. An apparatus for repairing fenders comprising a support, a frame adjustably connected to the support, die blocks adjustably connected to the frame for operating on opposite sides of the fender being repaired, guide rods carried by the die blocks and operating through openings in the frame, and dies carried by the die blocks.

8. An apparatus for repairing fenders comprising a support, a frame having spaced arms, an ear formed on each arm and having an opening therein, a die block adjustably carried by each arm, a guide rod secured to each die block and extending through the opening in the ear, and dies carried by the die blocks.

9. An apparatus for repairing fenders comprising a support, a frame having spaced arms, a threaded rod operable in each arm, die blocks detachably connected to each rod, and dies carried by the die blocks for engaging opposite faces of the fender being repaired.

10. An apparatus for repairing fenders comprising a support, a frame having spaced arms, a threaded rod operable in each arm, each of said rods having a recess adjacent one end, a die block carried by each rod, a pin extending through the block and engaging in the recess in the rod, and dies carried by the die blocks.

11. An apparatus for repairing fenders comprising a support, a frame adjustably connected to the support and having spaced arms, said arms being spaced a greater distance apart at the rear ends than at their forward ends, and dies carried by the arms and adapted to engage opposite faces of the fender being repaired, the greater space between the arms at the rear allowing adjustment of the frame with respect to the fender.

In testimony whereof I hereunto affix my signature.

WILLIAM C. J. GUILFORD.